Patented Feb. 24, 1953

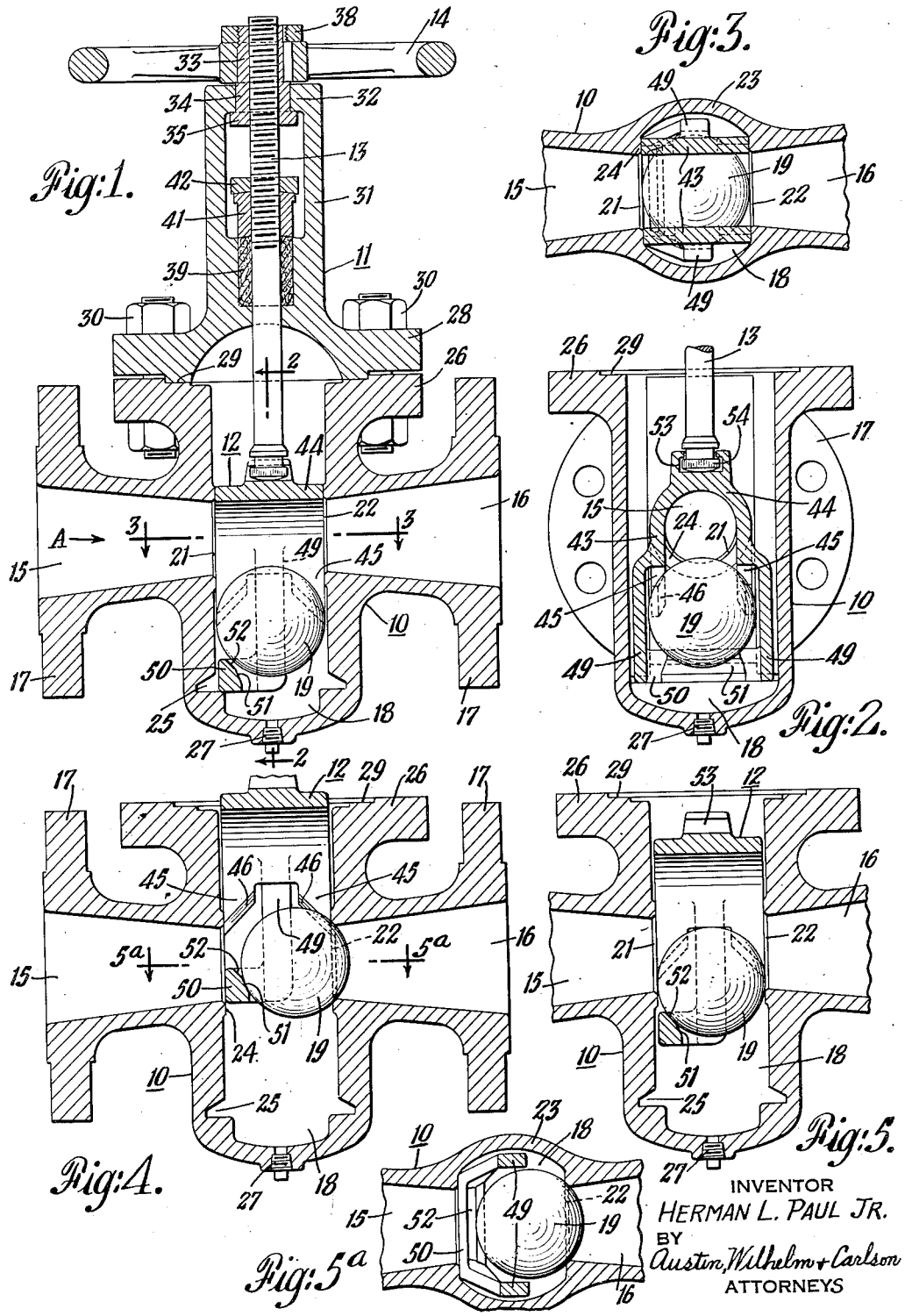

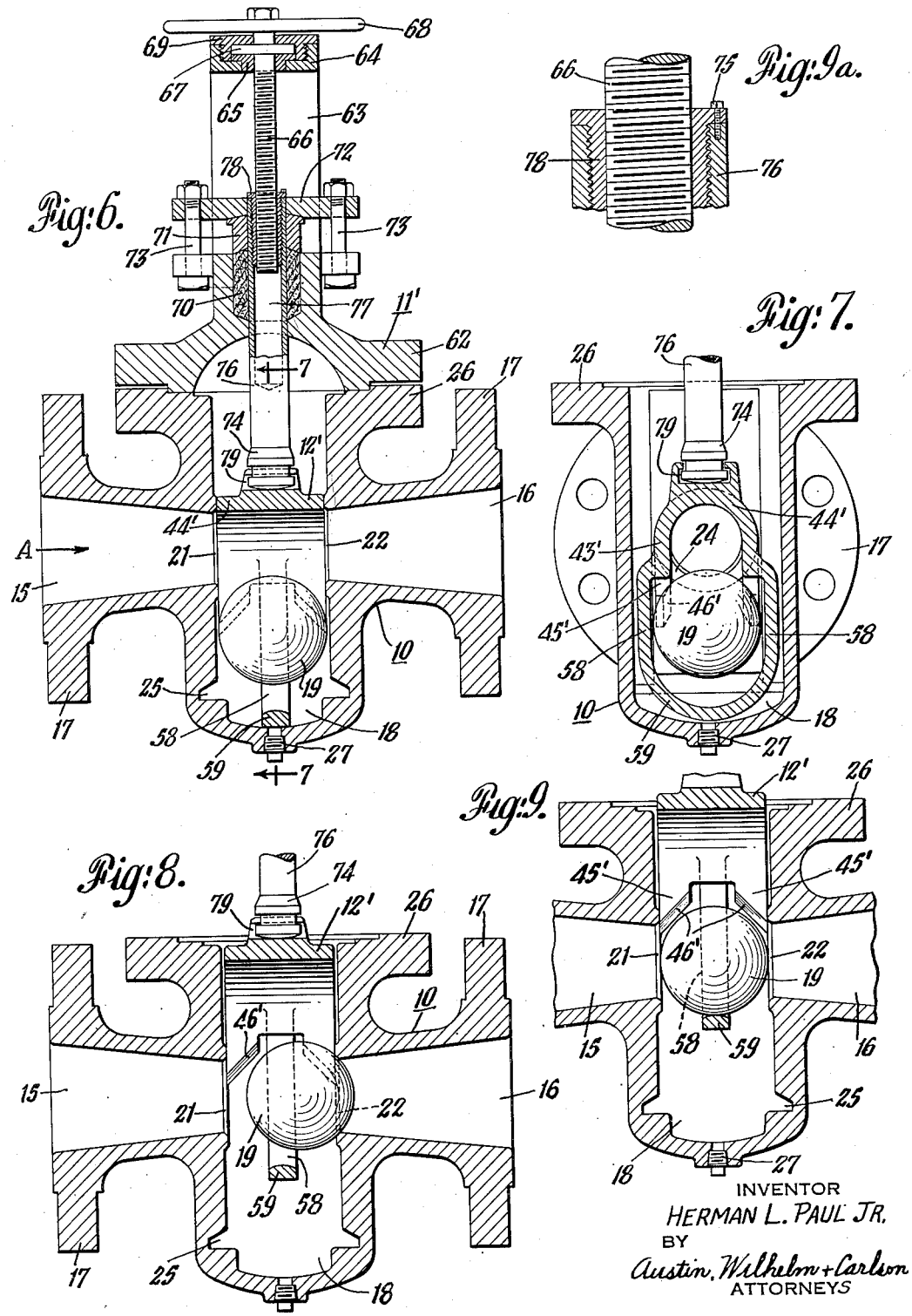

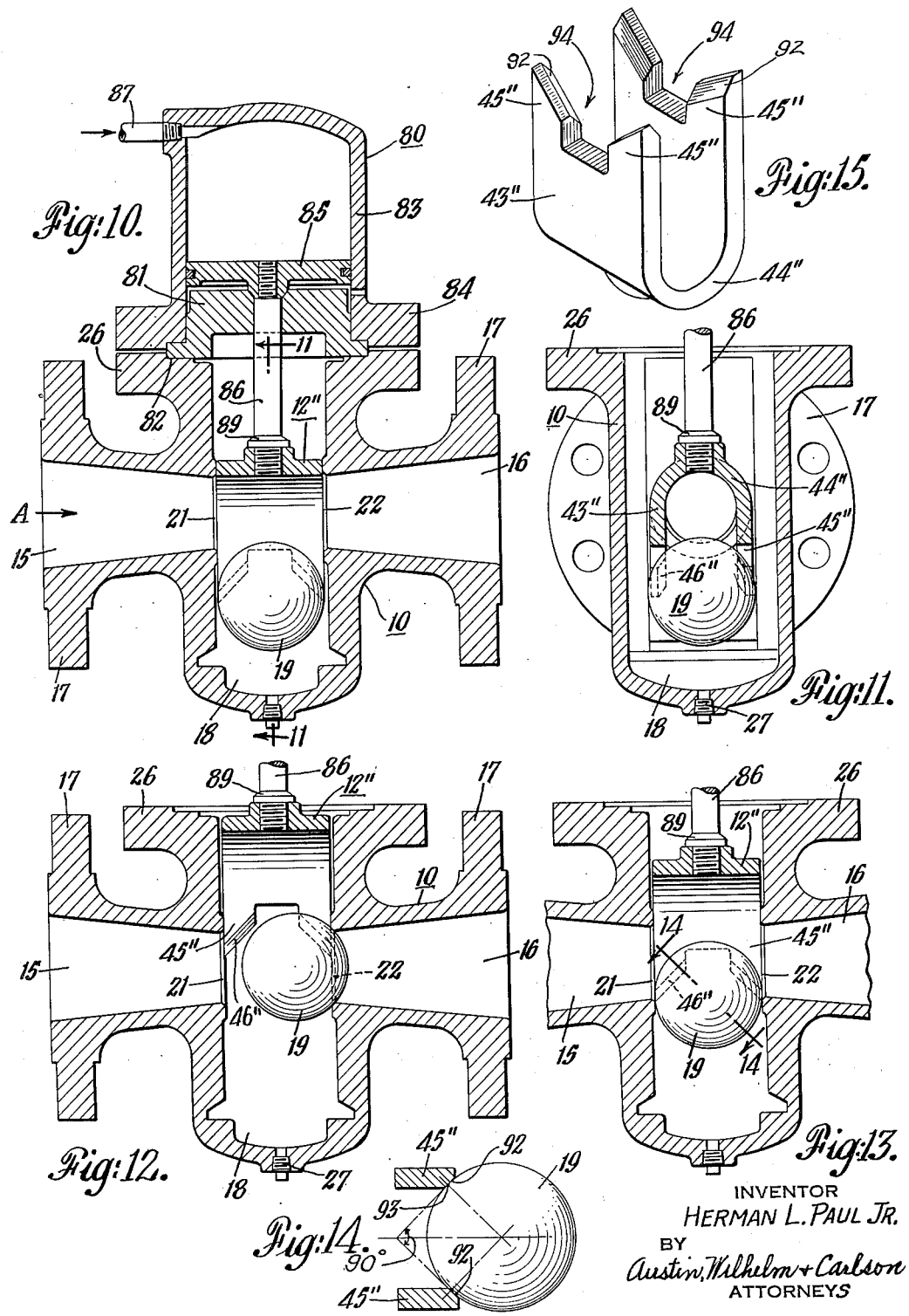

2,629,578

UNITED STATES PATENT OFFICE 2,629,578

BALL VALVE

Herman L. Paul, Jr., New Rochelle, N. Y., assignor to Paul Valve Corporation, Essex Fells, N. J., a corporation of New Jersey Application February 24, 1947, Serial No. 730,317

27 Claims. (Cl. 251—130)

1

The invention relates to valves for controlling the flow of fluids.

The present application constitutes a continuation-in-part of application, Serial No. 604,245, filed July 10, 1945, and of applications, Serial Nos. 661,151 and 661,152, both filed April 10, 1946; all of which prior applications are now abandoned.

Among the objects of the present invention are to provide a valve which is simple in construction, easy to operate, which has long life, which has high coefficient of discharge and minimum pressure drop.

An important feature of the invention is the utilization of Bernoulli's theorem to attain the above objects. According to this theorem, a member on the edge of a fluid stream is drawn from the periphery of the stream inwardly toward the middle of the stream by the faster flow and lower pressure there.

According to a preferred form of the invention, the valve comprises a straight-through passage having converging and diverging walls forming a venturi. A recess intersects the straight-through passage at the throat of the venturi, forming in effect opposed throats or seats. A ball contained in said recess is moved by an actuator substantially out of the path of fluid flow to open the valve and is drawn into the fluid flow to seat on one of the seats by the hydrodynamic lift due to the Bernoulli effect. The actuator may comprise a forked yoke having a hood portion adapted to bridge the flow space between throats to reduce turbulence. The yoke may also have wedges or pads adapted to engage between the sides of the ball and the seat to unseat the ball.

If desired, the actuator may have a locking wedge for locking the ball in its seat; or, in some cases, the actuator may have a strap which holds the ball loosely in closable position so that it may seat on either seat, depending upon direction of fluid flow. The actuator may be operated by a pushbutton, or by a screw threaded spindle, or by a fluid operated servo-motor.

Among further features of the invention are the provision of the venturi to enhance the Bernoulli effect, the bridging hood, the opening wedges, the locking wedge and the holding strap.

The invention also consists in certain new and original features and combinations hereinafter set forth and claimed.

Although the novel features which are believed to be characteristic of this invention will be particularly pointed out in the claims appended

2 hereto, the invention itself, as to its objects and advantages, and the manner in which it may be carried out, may be better understood by referring to the following description taken in connection with the accompanying drawings forming a part hereof, in which:

Fig. 1 is a longitudinal section through one preferred form of valve, the valve being shown in full open position, with the fluid flow holding the ball up against the opening wedges;

Fig. 2 is a transverse section on the line 2—2 of Fig. 1;

Fig. 3 is a plan section on the line 3—3 of Fig. 1;

Fig. 4 is a fragmentary longitudinal section of the valve shown in Fig. 1, shown in closed locked position;

Fig. 5 is a fragmentary longitudinal section of the valve shown in Fig. 1, showing the valve partially closed, with the lock bar supporting the ball, with no fluid flow through the valve;

Fig. 5a is a detail of the lock bar taken on the line 5a—5a of Fig. 4;

Fig. 6 is a longitudinal section of a modified form of valve, the valve being shown in full open position, with the fluid flow holding the ball up against the opening wedges;

Fig. 7 is a transverse section on the line 7—7 of Fig. 6;

Fig. 8 is a transverse section of the valve shown in Fig. 6, the valve being shown in closed position but with the opening wedges about ready to engage the ball for opening the valve;

Fig. 9 is a longitudinal section of the valve shown in Fig. 6, the valve being shown in full closable position, the ball being supported by the strap with no fluid flowing through the valve, the ball being in central position to engage either seat;

Fig. 9a is an enlarged detail showing a locking screw for locking the wear nut to the stem;

Fig. 10 is a longitudinal section through a further modified form of valve, the valve being shown in full open position with the fluid flow through the valve holding the ball up against its opening wedges;

Fig. 11 is a transverse section on the line 11—11 of Fig. 10;

Fig. 12 is a fragmentary longitudinal section of the valve shown in Fig. 11 with the valve shown in closed position, with the opening wedges free of the ball but ready to engage the ball for opening the valve;

Fig. 13 is a fragmentary longitudinal section through the valve shown in Fig. 10, the valve being shown in part open position, the ball being held up against its opening wedges by the flow of fluid through the valve;

Fig. 14 is a fragmentary section taken on the line 14—14 of Fig. 13, illustrating the contact of the wedging pads with the ball; and Fig. 15 is a perspective of the actuator of Fig. 10 showing the angle of the taper on the opening wedges, such angle illustrating also the opening wedges on the actuators of Figs. 1 and 6.

In the following description and in the claims, various details will be identified by specfic names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings, and more particularly to Figs. 1 to 5a, the valve comprises in general a valve body 10 having a through fluid passage intersected by a transverse recess, the latter being closed by a bonnet 11. A forked actuator 12 operated by stem 13 and hand wheel 14 engages the ball 19 to open and close the valve.

The valve body 10 has a straight-through passage made up of a converging conduit 15 and a diverging conduit 16, assuming the fluid flow to be in the direction of the arrow A. The converging conduit 15 and diverging conduit 16 may be of circular cross section throughout and of equal length. The valve body has conventional flanges 17 for coupling to connecting pipes (not shown) in any conventional manner, as by welding or by bolts.

The converging and diverging passages 15 and 16 form in effect a venturi whose throat is intersected by the transverse recess 18. The end walls of the recess 18 are flat and have annular bosses 24. The surface of bosses 24 are plane and intersect the passages 15 and 16 to form circular conical seats 21, 22. The side walls of the recess 18 are rounded as indicated at 23. The flat end walls are undercut to form bottom notches 25 for a purpose hereinafter discussed.

The valve body may have a drain hole at the bottom of recess 18, closed by threaded plug 27. The valve body has a top flange 26 to which the bonnet 11 is bolted.

The bonnet 11 has a base flange 28 with a circular projection seatable within a seat 29 on body flange 26. A plurality of bolts, indicated by 30, pass through the flanges 26, 28 to hold the bonnet and valve body assembled.

Projecting upwardly from the base flange 28 are posts 31 supporting a bearing 32 at the top. Within bearing 32 is a collar 33 having a rotatable journal 34 and an end flange 35. Hand wheel 14 is keyed to collar 33 and a nut 38 holds the hand wheel 14 and collar 33 in assembled relationship.

Spindle 13 has threaded engagement with collar 33 and is non-rotatably mounted in actuator 12 so that, by turning hand wheel 14, the spindle 13 may be made to rise and fall. Spindle 13 passes through a packing box 39 having suitable packing therein, the box being closed by gland 41 held in position by follower bar 42. Bar 42 is bolted to the bonnet 11 by bolts (not shown), the structure being illustrated more in detail in Fig. 6 (see bolts 73 for follower bar 72 to bonnet 11').

Non-rotatably slidable in recess 18 is actuator 12, the top of which has a T-slot 53 to receive flange 54 on spindle 13, the flange 54 being square and engaging straight surfaces on the sides of T-slot 53 to prevent rotation of spindle 13.

Actuator 12 comprises a yoke 43 having a hood portion 44 whose top inner surface is semi-cylindrical so that it may bridge the flow space between seats 21 and 22 when the valve is in full open position. The hood 44 is laid out on the same radius as the smaller diameters of seats 21 and 22 (or on a slightly larger radius) and is substantially flush with the top and sides of the seats 21, 22, to provide confining walls for the main fluid stream passing through the valve and thus reduce turbulence.

The hood 44 terminates in four legs 45 whose ends have tapered end wedges or pads 46 engageable with the ball 19 for purposes hereinafter discussed more in detail. Also depending from the hood 44 are outwardly offset side stirrups 49 supporting at their lower ends an offset lock bar 50.

Lock bar 50 has a wedge surface 51 adapted to engage ball 19 to tightly wedge the ball against seat 22, as shown in Fig. 4. Lock bar 50 has a straight central portion engageable with the plane boss of seat 21, and straddling seat 21, to provide a backing for the action of wedge surface 51 when the ball is locked against seat 22. Lock bar 50 also has a riding surface 52 adapted to engage the ball 19 for manually raising the ball, when there is no fluid flow, or such low velocity flow, as to be insufficient to raise the ball to engage the opening wedges.

The angle of riding surface 52 is such as to produce no binding effect against the ball as it is raised from its lowermost position to its uppermost position while the angle of locking wedge surface 51 is such as to wedge the ball tightly against its seat.

The angle of wedges or pads 46 is such as to ease or roll the ball off its seat when opening the valve and to prevent spinning or chattering of the ball when the ball is held, in partially open or full open position, centered with respect to the four wedges 46. These wedges, as shown, have certain taper angles both in side elevation, as shown in Fig. 1, and in end elevation, as shown in Fig. 2, but these angles may vary considerably and still meet the requirements of ease in unseating the ball and of non-chattering and non-spinning. These wedges and the angles thereof are discussed more at length in connection with Figs. 10 to 15.

To operate the valve shown in Figs. 1 to 5a, it is only necessary to turn the hand wheel 14 in the proper direction. The valve is shown in full open position in Figure 1 with lock bar 50 engaging the bottom of undercut notches 25; this limits the full open position of the yoke 43 to place the inside surfaces of the top and sides of the hood flush with the corresponding top and sides of the seats 21 and 22 to obtain straight-through, unimpeded, fluid flow through the valve.

The valve makes use of the Bernoulli theorem, according to which a member is always drawn from the edge of a flowing stream toward its middle by the faster flow and lower pressure there. The ball, being placed on the edge of the stream flow, tends to move to the center of the stream flow.

The Bernoulli effect, provided there is sufficient fluid velocity through the valve, normally holds the ball 19 centrally against the opening wedges 46, as shown in Figs. 1 and 2. It will be noted that the ball, in full open position, projects slightly beyond the straight line connecting the bottoms of seats 21 and 22. This slight projection of the ball is for the purpose of engaging the ball with the vena contracta caused by the flow of fluid through the venturi. While the valve may be built to move the ball entirely clear of this throat space so it does not engage the vena contracta, and still utilize the Bernoulli effect, it has been found that the projection of the ball 19 to the edge of the vena contracta does not reduce fluid flow and has the advantage of reducing the maximum range of actuator movement between full open and full closed position.

To close the valve, assuming fluid is flowing through the valve sufficiently fast to hold the ball engaged with wedges 46, the hand wheel 14 is turned to raise actuator 12 until the ball comes into proximity with its seat when further movement of the actuator, together with the fluid flow in the direction A, causes the ball to seat in its seat 22. Further upward movement of actuator 12 causes wedging surface 51 to engage the ball, which tightly wedges the ball against its seat, holding it there even though the fluid pressure should diminish to zero and even through fluid pressure should be reversed.

To close the valve when the velocity of the fluid is so small as to be insufficient to lift the ball against opening wedges 46 or when there is no fluid flow at all, the raising of actuator 12 causes the ball to ride on riding surface 52 until it comes adjacent seat 22, when it rolls into its seat, the locking wedge surface 51 then engaging the ball to wedge the ball in its seat as described above.

To open the valve from full closed and locked position as shown in Fig. 4, turning of the hand wheel first releases locking bar 50 and, if there is pressure in the direction of arrow A, the ball will remain seated until the opening wedges 46 on either side of seat 22 engage the ball. These wedges engage between the ball and the adjoining wall on either side of seat 22 and gently ease and roll the ball off its seat sufficiently to crack the valve. Further downward movement of actuator 12 moves the ball downwardly, the fluid flow, if sufficient, centering the ball against the four opening wedges and holding it there, as shown in Fig. 1.

Referring now to Figs. 6 to 9, a modified form of valve is shown. The valve is generally similar to the valve shown in Figs. 1 to 5a but has a different operating spindle construction and a different actuator.

The valve body 10 is identical with the valve body 10 of Figs. 1 to 5a and the various parts thereof are given the same reference characters for convenience, and will not be described again.

The actuator 12' is similar to the actuator 12 in Figs. 1 to 5 having the same yoke 43', hood 44', legs 45' and opening wedges 46' as the corresponding unprimed parts in Figs. 1 to 5. These parts also have the same relationship to the passages 15 and 16 and to the recess 18.

Instead of having a locking bar 50, the actuator 12' has outwardly offset stirrups 58 merging into a curved strap 59 having a gently rounded upper surface. This is for the purpose of holding the ball in position to be engageable with either seat 21 or 22, as shown in Fig. 9, such relationship to be described hereinafter in more detail.

The valve has a bonnet 11' having a base flange 62 suitably bolted to base flange 26, as in Figs. 1 to 5a. Base flange 62 has posts 63 connected by an upper seat 64. A flanged bushing 65 rests in seat 64, being held there by a cap 69 threaded into the upper part of seat 64.

Spindle 66 has fixedly secured thereto hand wheel 68 and is rotatable therewith and has an integral collar 67 rotatable in the space between cap 69 and bushing 65, the effect being to permit rotation of hand wheel 68 but to constrain it axially.

Stem 76 has a square head non-rotatably mounted in T-slot 79 and has a bore 77 whose uper end is threaded to engage a removable threaded wear nut 78. Wear nut 78 may be screwed to stem 76, as indicated by 75 in Fig. 9a, to prevent unintentional relative rotation between these two members. Spindle 66 has threaded engagement with wear nut 78 so that, when the hand wheel 68 is rotated, the actuator 12' rises or falls to close or open the valve.

Stem 76 passes through stuffing box 70 closed by gland 71 which is held in place by bar 72 bolted to lugs on base 62 by bolts indicated by 73.

The stem has a shoulder 74 engageable with the inside surface of bonnet 11' to limit the upward movement of actuator 12' when the ball is fully seated, as shown in Fig. 8. It is desirable to have the opening wedges 46' and strap 59 slightly spaced from the ball 19, when the ball is in fully closed position, to avoid any accidental contact with the ball due to expansion of valve parts from high temperature fluid. The engagement of the strap 59 with the bottom of the recess determines the full open position of the valve, with the hood 44' flush with the seats 21, 22.

The advantage of the spindle construction of Figs. 6 to 9a is the ability to remove and replace the wearable spindle 66 and wear nut 78 without cutting the valve out of service. Another advantage is the convenient indication to the operator, by the position of the exposed hollow stem 76, whether the valve is open, or closed, or part-way open.

To remove spindle 66 and wear nut 78, it is only necessary to have the valve in full closed position with the stem shoulder 74 engaging the bonnet 11'. Then it is only necessary to remove hand wheel 68 from spindle 66, then remove cap 69, after which the spindle 66 may be completely removed from wear nut 78. Wear nut screw 75 is then removed after which wear nut 78 may be unscrewed from stem 77. A new wear nut 78 or a new spindle 66, or both these parts, as may be required, may then be replaced when the valve is reassembled.

The operation of this valve and its advantages will be largely apparent from the description of Figs. 1 to 5a. The unseating of the ball by engagement of the opening wedges 46' will be the same as described in connection with the opening wedges 46 in Figs. 1 to 5a.

The closing movement of the valve will be similar to that described in connection with Figs. 1 to 5a, the ball centering on the four wedges and rising with the actuator 12' by action of the Bernoulli principle if there be sufficient fluid flow.

If there be insufficient fluid flow, the ball will be lifted by strap 59 which will be raised to the position shown in Fig. 9, holding the ball in more or less symmetrical position with respect to seats 21 and 22, if there is no fluid flow. Actually, due to the crowned shape of the contacting surface of strap 59, the ball may tend to roll to one seat or the other, but the ball is free to seat against either seat depending upon the direction of fluid flow through the valve.

An advantage of the strap construction shown in Figs. 6 to 9a over and against the locking wedge construction shown in Figs. 1 to 5a is, simplicity in manufacture, particularly in cases where the locking wedge is not necessary. It should be borne in mind that, with the strap in valve-closable position, fluid flow in either direction will immediately seat the ball, there being perhaps a small initial spurt of fluid through the valve before the ball seats. This may not be objectionable in many cases.

Referring now to Figs. 10 to 13, for a further modification, the valve shown here is generally similar to that shown in Figs. 1 to 5a except for different actuator and different operating mechanism. The valve body 10 is identical and the parts thereof are given the same reference characters for convenience.

The actuator 12″ is similar to the actuator 12 in Figs. 1 to 5a and Figs. 6 to 9a except that the stirrups and lock bar are omitted entirely. This actuator 12″ represents the simplest form of actuator, having a hood 44″ and legs 45″ and opening wedges 46″ identical with the corresponding parts in Figs. 1 to 5a and cooperating with the ball and cooperating with the valve seats in exactly the same way as in Figs. 1 to 5a.

As it will be seen particularly in Fig. 15, the yoke member 43″ (shown inverted for purposes of illustration) comprises two main branches extending from the closed hood portion 44″, each branch having a V-shaped notch 94 dividing it into a pair of legs 45″. The inner edges of said notches are beveled to form beveled surfaces 92 so that, in effect, each leg is tapered with respect to two planes; it is tapered with respect to the plane of the ball seat; it is also tapered with respect to the plane of the branches of the yoke. These tapered surfaces provide, in effect, troughs (see Fig. 14) which guide the ball from its centered position, where it is symmetrically disposed with respect to the actuator, to its "off-center" position when the ball is seated.

As shown in Fig. 14, the angles are such that the points 93 of contact of the ball with opposite sides of the troughs, are located as closely as possible to the inside surfaces of the branches. The loci of the contact points 93 form straight lines of contact along bevel surfaces 92, as the ball rolls along these surfaces from its centered position to its seated position. Thus the wedges get underneath the ball as far as possible, when the ball is seated, without projecting into the flow space so that the ball is raised and rolled off its seat with minimum effort.

While the angles of taper may vary somewhat, the angle of the V of notches 94 is shown as 90 degrees, making the angle of each side 45 degrees with respect to the planes of the ball seats; the angle of the sides of the troughs, indicated in Fig. 14, is also 90 degrees, making the angle 45 degrees with the plane of the yoke branches. It will be understood that the angles of the pads or wedges in the other forms shown herein and their cooperation with the ball are the same as described in connection with Figs. 10 to 15.

The operating mechanism of Figs. 10 to 15 comprises a servo-motor 80 made up of a cylinder head 81 seatable in seat 82 of casing flange 26. Cylinder 83 has a flange 84 adapted to be bolted to flange 26 to hold the servo-motor and valve casing in assembled relation.

Within cylinder 83 is piston 85 having piston rod 86 threaded to actuator 12″. A fluid supply pipe 87 connects with the upper end of cylinder 83 and the lower end has a vent 88. The shoulder 89 on piston 86 engaging head 81 limits the opening movement of the valve.

It will be understood that, when fluid such as air is supplied to conduit 87, the actuator 12″ will unseat the ball and move the ball to full open position, as shown in Fig. 11, the ball being held centrally against its opening wedges by the Bernoulli principle, as above described. To close the valve it is only necessary to release pressure from a pipe 87 and the fluid flow through the valve, raising the ball, together with the pressure differential, acting on the area of the piston rod 86, causes the actuator 12″ and ball to rise and the ball to seat.

It will be understood that, in place of the servo-motor operator, various forms of screw threaded spindle and hand wheel devices may be used to open and close this valve as in the other forms. It is a feature of all of these valves that the valve may be held in positions between full open and full closed position. Such a position is illustrated in Fig. 13 where the valve is shown approximately half open, the ball being held against its opening wedges by the Bernoulli principle.

By the use of any of these valves, straight line throttling can be achieved. That is to say, the rate of flow through the valve is directly proportional to the amount of longitudinal displacement of the actuator from opening position. This follows from the nature of a ball rolling out of a circular seat and is made possible in the present valve by the location of all parts of the actuator out of the throat of the venturi so that the only impedance to fluid flow through the valve, between open and closed position, is the ball itself.

The proportions of these valves may vary somewhat but good results have been obtained by making the Venturi ratio, that is the ratio of the diameter at the throat of the venturi to the maximum diameter of the venturi anywhere between 0.55 to 0.70. The ratio ⅝ is an ideal working ratio in most cases. Furthermore, the preferred ratio of the distance between seats to the larger Venturi diameter is between 0.9 and 1.3. The venturi may be omitted entirely, if desired. In any event, best results have been obtained when the ball diameter is equal substantially to the distance between seats or throats.

The size of the valves themselves may vary anywhere from small hose valves to big power operated valves, such as used in powerhouse and industrial plants.

The valves have a wide range of uses and are useful for almost anything requiring a valve. They can handle lowest and highest pressures and temperatures. They can handle gases and liquids of a wide range of viscosities, including steam, air, oil, water and chemicals. Due to the easy action of the opening wedges, even large valves may be operated by hand. The valves may also be power operated and may be used as turbine trip, throttle valves, remote control, casualty valves, etc.

The hydrodynamic action according to the Bernoulli principle is obtainable over a wide range of fluid velocities and the Venturi principle, by increasing the throat velocity over and above velocity in the pipe, makes the Bernoulli lift effective over a greater range of pipe velocities.

Since the Bernoulli effect will lift large heavy metal balls, it will also lift any foreign matter which might settle out in the bottom of the valve when the valve is closed, thus making the valve self-flushing. This effect also prevents settling of foreign matter in the valve when fluid is flowing.

The Venturi shaped body reduces the physical dimensions of the valve for handling any given flow rate. The yoke and hood acts to reduce turbulence. Thus full pressure applied at the inlet of the valve is largely recovered at the outlet. The rate of discharge through the valve is also very high, as compared to an open pipe of the larger Venturi diameter.

The proper ratio of ball diameter to seat diameter insures tight seating and the ball, resting on a conical or convex seat, obtains ideal line contact. The fact that a ball never seats exactly in the same position on the seat insures long life to the ball.

The rolling of the ball from its seat by the opening wedges is accomplished with small effort and removes the ball without injury to the ball or seat. There is no danger of galling. The placing of the ball at the edge of the vena contracta in full open position minimizes the range necessary to operate the valve between full open and full closed positions.

When the hydrodynamic lift on the ball is great enough to lift the ball, the lifting force is sufficient to hold the ball firmly against the angular pads or wedges, producing enough surface friction on the ball to prevent spinning and fluttering. When the hydrodynamic lift is insufficient to lift the ball, the ball lies quietly in the bottom of the recess. When the flow rate changes from the second condition to the first condition, as soon as sufficient lift is generated, the ball snaps from its position in the bottom of the recess up against the pads, the lift increasing as the ball moves upwardly. The Bernoulli effect is usable in all positions of the valve—in addition to upright as shown, inverted, on its side, etc.

The vital parts for sealing flow constitute the ball and its seat, both of which may be precision ground, thus insuring positive stoppage of flow. The seats may be integral with the valve body or they may be in the form of annular inserts.

The valves may utilize only a single seat as in Figs. 1 to 5a or may utilize both seats as in the other figures. In any case where conditions are such as to require seating only in one direction, the valve life may be doubled by reversing the valve body when one seat becomes impaired. The use of the parallel bosses for the seats eliminates the need for machining the entire throat surfaces of the recess. It is only necessary to machine the surfaces of the bosses to obtain parallel plane surfaces for the actuator to work against.

Straight line throttling is obtained due to the inherent relationship between a ball rolling out of a circular seat and due to the fact that the actuator is kept out of the main path of fluid flow at all times, regardless of whether the ball is in partly open or full open position.

High efficiency is obtained due to lack of turbulence and straight fluid flow. The present valves combine the high unit load, line contact seat seal of conventional globe and angle valves with the negligible pressure drop and through, non-turbulent flow of gate valves.

While certain novel features of the invention have been disclosed herein, and are pointed out in the annexed claims, it will be understood that various omissions, substitutions and changes may be made by those skilled in the art without departing from the spirit of the invention.

What is claimed is:

1. In a valve, a casing having a substantially straight flow passage extending therethrough and a recess intersecting said flow passage, said passage converging from both sides of the recess substantially to said recess to form a venturi, said recess intersecting said passage to form opposed aligned throats, and a relatively free ball movable between a position engaging one of said throats to a position offset from the axis of stream flow.

2. In a valve, a casing having a substantially straight flow passage extending therethrough and a transversely extending recess intersecting said passage, said passage converging from both sides of the recess substantially to said recess to form a venturi, said recess having opposed throat surfaces intersecting said passage to form opposed aligned throats, at least one of said surfaces being plane to form a circular seat, a ball in said recess and having a diameter substantially greater than the diameter of said seat, said opposed throat surfaces being spaced apart a distance substantially equal to the diameter of the ball, said ball being movable from a position substantially out of the flow space between said throats to said seat.

3. In a valve, a casing having a substantially straight flow passage extending therethrough, said passage having a transversely extending recess intersecting it, said passage converging from both sides of the recess substantially to said recess to form a venturi, said recess having opposed throat surfaces intersecting said passage to form opposed aligned throats, at least one of said surfaces being plane to form a circular seat, a ball having a diameter substantially greater than the diameter of said seat and located in said recess, said transverse recess being sufficiently long to enable said ball substantially to clear said passage, and an actuator disposed in said recess and having surface contact with the ball for removing said ball from its seat against the fluid pressure holding it there.

4. In a valve, a casing having a flow passage extending therethrough and a recess intersecting it, said recess having opposed throats at least one of which is a circular seat, the part of said recess directly between said opposed throats constituting a stream space, a ball positionable on said seat, an actuator movable in said recess and having a branch on either side of said stream space, each branch having a wedge surface sloping away from the adjacent seat, said wedge surfaces being engageable with the ball to unseat the ball, wedge surfaces forming guides or ways on which said ball rolls between open and closed positions of the valves.

5. In a valve, a casing having a flow passage extending therethrough and a recess intersecting it, said recess having opposed throats at least one of which is a circular seat, the part of said recess directly between said opposed throats constituting a stream space, a ball having a diameter substantially greater than the diameter of said seat and located in said recess, an actuator movable in said recess and having a branch on either side of said stream space, each branch having a V-shaped notch forming a pair of legs, said notches forming guides or ways adapted to hold said ball centered with respect to the four legs.

6. In a valve, a casing having a substantially straight flow passage extending therethrough, said passage having a transversely extending recess intersecting it, said recess having opposed walls, at least one of which is a plane surface, intersecting said passage to form at least one circular seat, a ball in said recess, an actuating member comprising a yoke straddling the flow space between said opposed walls and movable in said recess, said yoke having a hood at its closed end and having legs, said hood being adapted to register with and bridge the walls of the flow passage when the valve is in full open position, said legs having feet to stand against said ball to hold said ball substantially clear of said flow space when the valve is in full open position.

7. In a valve, a casing having a substantially straight flow passage extending therethrough and a transversely extending recess intersecting said passage, said passage converging from both outer ends toward said recess to form a venturi, said recess having opposed throat surfaces intersecting said passage to form opposed throats, one of said throat surfaces being plane to form a circular seat, the part of said transversely extending recess between said opposed throats constituting a flow space, a ball having a diameter substantially greater than the diameter of said seat and located in said recess, said throat surfaces being spaced apart a distance substantially equal to the diameter of said ball, an actuator movable in said recess and comprising a yoke having a hood at its closed end, the yoke straddling said flow space, said hood bridging the space between said throats and having an inner surface substantially continuous with the throats, said yoke having a branch on either side of the flow space, each branch terminating in legs with tapering ends standing against the hemispheral surface of said ball facing said hood through the space directly between said aligned openings.

8. In a valve, a casing having a flow passage, said passage having a transversely extending recess intersecting it, said recess having opposed plane surfaces intersecting said passage to form opposed circular seats, a ball in said recess, an actuator comprising a yoke straddling said ball and the space between said seats and movable in said recess for opening and closing the valve, said yoke having a flow opening to register with said seats when the valve is in open position, said yoke having legs with tapering ends engageable with said ball to unseat the ball, said yoke having an extension strap depending therefrom remote from said flow opening to loosely contain the ball between said tapering ends and said strap to hold said ball in line with said opposed seats when the actuator is in closed position, whereby the ball is in position to freely seat on either seat depending upon the direction of fluid flow.

9. In a valve, a casing having a substantially straight flow passage extending therethrough, said passage having a transversely extending recess intersecting it, said recess having opposed surfaces intersecting said passage to form opposed aligned openings, at least one of said surfaces being plane to form a circular seat, a ball having a diameter substantially greater than the diameter of said seat and located in said recess, said opposed openings being of substantially the same diameter and being spaced a distance substantially equal to the diameter of said ball, said transverse recess being sufficiently long to enable said ball to be moved to full open position substantially entirely clear of the flow space directly between said openings, and an actuator movable lengthwise of said recess for removing said ball from its seat against the fluid pressure holding it there, said actuator having a ball-unseating portion movable in a path entirely out of the flow space directly between said openings and disposed entirely out of said flow space in all positions of the ball between full closed and full open position.

10. In a valve, a casing having a flow passage and a transversely extending recess intersecting it to form a seat, a ball in said recess seatable on said seat, an actuator having a closed end and spaced legs whose ends stand against the near surface of the ball, to provide a flow opening through the actuator, and means to move said actuator to selectively register said flow opening or said ball with said seat.

11. In a valve, a casing having a flow passage, said passage having a transversely extending recess intersecting it, said recess having at least one plane surface intersecting said passage to form a circular seat, said recess having a wall opposite said seat, a ball in said recess, an actuator in said recess and movable generally lengthwise thereof, said actuator having a wedge engageable between the ball and the wall adjacent the seat for unseating said ball, said actuator having a second wedge engageable with the wall opposite said seat and with said ball to hold the latter on said seat.

12. In a valve, a casing having a flow passage, said passage having a recess intersecting it to form opposed seats, a ball in said recess, a cage comprising a forked member and a holding strap, said forked member having a closed end and legs whose ends are engageable with the near surface of the ball to provide a flow opening through the forked member between its closed end and the ball, said strap having a part disposed on the side of the ball opposite said legs to hold the ball loosely therebetween, means for adjustably moving said cage, whereby said cage holds said ball in line with said opposed seats, when the cage is in closed position and the ball is in position to freely seat on either seat depending upon the direction of fluid flow, and whereby said cage holds said flow opening in register with said seats and said ball substantially clear of said seats, when the cage is in full open position.

13. A controllable valve structure comprising a casing having a generally straight flow passage extending therethrough and a recess intersecting it, the walls forming said recess having aligned opposed orifices, at least one of which constitutes a circular seat, a loose ball in said recess seatable on said seat, an actuator to displace said ball from said seat, said recess being sufficiently long to permit said actuator to move the ball from closed position on said seat to full open position substantially out of the flow space directly between said orifices, said valve structure being characterized by the fact that the aligned opposed orifices are of such size and are spaced apart a distance substantially equal to the ball diameter so that the dynamic lift, caused by fluid flow through the valve, exerts a closing force on said ball, when said ball is in full open position, sufficient to seat said ball, upon withdrawal of the actuator.

14. In a valve, a casing having a flow passage and a recess intersecting said flow passage, the intersection of said recess and flow passage forming a circular seat, a ball in said recess seatable on said seat, an actuator in said recess for moving said ball between closed position on said seat and open position substantially clear of said seat, said ball occupying throttling position between said open and closed position, said ball and seat defining the flow passage in said throttling position, said actuator having a ball unseating portion contacting the ball surface, said unseating portion being movable in a path entirely out of register with said seat, said actuator being out of said flow passage in all positions of the ball between closed position and open position, and means for guiding said actuator to move it in a straight line substantially parallel with the plane of said seat.

15. In a valve, a casing having a flow passage and a recess transversely intersecting said flow passage to provide a circular seat, a ball in said recess, an actuator in said recess and movable generally lengthwise thereof, said actuator having an unseating portion engageable between the surface of the ball and the casing wall adjacent said seat for unseating the ball, said actuator having a locking portion engageable between the surface of the ball and the casing wall opposite said seat to hold the ball on its seat.

16. In a valve, a casing having a flow passage with a recess intersecting the flow passage substantially perpendicular thereto and forming opposed openings, one of said openings constituting a seat, a cage slidable lengthwise of said recess, said cage comprising a forked member and a wedge bar, said forked member having a closed end and spaced legs whose ends are engageable with the near surface of the ball to provide a flow passage through the forked member between its closed end and the ball, said wedge bar being disposed on the side of the ball opposite the ends of said legs to hold the ball loosely therebetween, said wedge bar engaging between said ball when seated and the casing wall opposite said seat to wedge the bar and ball into closed position when the cage is in closed position, said cage holding the cage flow passage in register with said seat and said ball substantially clear of said seat when the cage is in full open position, and means for adjustably moving said cage lengthwise of said recess to selectively register said ball or cage flow passage with said seat.

17. A controllable valve structure comprising a casing having a generally straight flow passage extending therethrough and a recess intersecting it, said recess having opposed walls having aligned opposed openings, at least one of said openings constituting a circular seat, a loose ball in said recess seatable on said seat, said opposed walls being spaced apart a distance substantially equal to the ball diameter, an actuator having a locking bar engageable between the surface of said ball, when seated, and the opposed wall opposite said seat to wedge said ball against said seat.

18. In a valve, a casing having a wall with a valve seat therein, a ball in said casing seatable on said seat, an actuator on the same side of said wall as said ball, said actuator having an opening wedge, said wedge having an apex and a butt portion, means to move said actuator to move said wedge, with its butt portion trailing its apex, along a path parallel to the plane of the seat, said path being tangential to the margin of the wall surrounding said seat, said wedge having a part engageable with said path and a part engageable with a lesser circle of said ball located in a plane parallel to the axis of said seat and passing through said path.

19. In a valve, a casing having walls defining a substantially straight flow passage extending therethrough, said passage having a transversely extending recess intersecting it, said passage converging from both sides of the recess substantially to said recess to form a venturi, the intersection of said recess and said flow passage forming opposed walls, at least one of said walls intersecting said passage to form a circular seat, a ball seatable on said seat, an actuating member comprising a yoke, straddling the flow passage between said opposed walls, said yoke having a hood portion at its closed end and having legs engaging the near surface of the ball, said yoke forming with said ball the throat of the venturi, when the valve is in full open position.

20. In a valve, a casing having a substantially straight flow passage extending therethrough, said passage having a transversely extending recess intersecting it, said recess having opposed walls intersecting said passage to form at least one seat, a ball in said recess, an actuating member comprising a hood having a flow opening and a ball unseating part disposed against the near surface of the ball and holding said ball out of said flow opening, means to move said actuator to selectively register said flow opening, or said ball, with said seat, said hood being of sufficient dimension, in the direction of fluid flow, to bridge the opposed walls of the recess when said flow opening is in register with said seat.

21. In a valve, a casing having walls defining a substantially straight flow passage extending therethrough, said passage having a transversely extending recess intersecting it, said recess having opposed walls, at least one of which is a plane surface, intersecting said passage to form at least one circular seat, a ball in said recess, an actuating member comprising a yoke straddling the flow passage between said opposed walls and movable in said recess, said yoke having a hood with legs, said legs having their ends engaging the near surface of the ball to hold it substantially clear of said flow passage when the valve is in full open position, a locking member having a wedge surface to engage said ball and hold it against its seat when the valve is in fully closed position, said actuating member having side stirrups extending from said hood to said locking member.

22. In a valve, a casing having walls defining a substantially straight flow passage extending therethrough, said passage having a transversely extending recess intersecting it, said recess having opposed walls, at least one of which is a plane surface, intersecting said passage to form at least one circular seat, a ball in recess, an actuating member comprising a yoke straddling the flow passage between said opposed walls and movable in said recess, said yoke having a hood at its closed end and having legs, said hood bridging said opposed walls and having its inner surface substantially co-extensive with the walls defining said flow passage and said legs having their ends engaging the near surface of the ball to hold it substantially clear of said flow passage when the valve is in full open position, a locking member having a wedge surface to engage said ball and hold it against its seat when the valve is in fully closed position, said actuating member having side stirrups extending from said hood outside the flow passage to said locking member.

23. In a valve, a casing having a flow passage and a transversely extending recess intersecting said passage to form a seat, a ball having a diameter greater than the diameter of said seat, said ball being disposed in said recess and seatable on said seat, an actuator in said recess movable generally lengthwise of the recess in a plane generally parallel to the plane of the seat, said actuator having spaced ball-engaging parts spaced apart a distance at least as great as the diameter of the seat, and engageable with said ball on either side of the seat at points entirely out of register with the seat passage, said ball-engaging parts being movable in paths which lie entirely out of register with the seat passage, said actuator having a flow opening between said spaced ball-engaging parts, means for moving said actuator to selectively seat said ball or unseat said ball without any part of the actuator traversing the seat passage.

24. In a valve, a casing having a flow passage extending therethrough and a recess intersecting it, said recess extending substantially transversely of the flow passage, the intersection of said flow passage and recess forming opposed openings, at least one of which is a circular seat, the part of said recess directly between said opposed openings constituting a stream space, a ball positionable on said seat, an actuator in said recess and having spaced branches whose lengths extend substantially lengthwise of the recess, said actuator having a position with a branch on either side of said stream space, said actuator being movable substantially lengthwise of said recess with said branches partaking of the lengthwise movement, each branch having a wedge surface sloping away from the plane of the adjacent seat, said wedge surfaces being engageable with the ball, when seated, at points between the ball and the margin of the wall surrounding the seat to remove the ball from its seat, said wedge surfaces forming guides or ways on which said ball rolls between open and closed positions of the valve, the inside surfaces of said branches being spaced apart a distance less than the ball diameter and substantially equal to the diameter of the seat.

25. In a valve, a casing having a flow passage extending therethrough and a recess communicating with the passage, seats on said casing surrounding said passage on opposite sides respectively of said recess, a freely movable ball, actuating means including a combined yoke and stirrup, said yoke having legs whose ends engage the near surface of the ball to provide a flow opening through the yoke between its closed end and the ball, said actuating means holding the ball loosely contained between the ends of said legs and said stirrup and clear of said flow opening, said actuating means serving to move the ball into an open position in said recess with said flow opening in communication with said seats and to move the ball from its open position to said passage to be further moved to a closed position against either one of said seats by the velocity and pressure of the fluid according to the direction in which it flows in said passage.

26. In a valve, a casing having walls defining a flow passage extending therethrough, said passage having a transversely extending recess intersecting it to form opposed seats, a ball in said recess, an actuating member comprising a yoke straddling the flow passage between said opposed seats and movable in said recess, said yoke having a hood and legs, said legs having their ends engaging the near surface of the ball to hold it substantially clear of said flow passage when the valve is in full open position, a holding member to engage said ball and hold it in line with its seats when the valve is in closable position, said actuating member having side stirrups extending from said hood to said holding member.

27. In a valve, a casing having walls defining a substantially straight flow passage extending therethrough, said passage having a transversely extending recess intersecting it, said recess having opposed walls intersecting said passage to form opposed circular seats, a ball in said recess, an actuating member comprising a yoke straddling the flow passage between said opposed walls and movable in said recess, said yoke having a hood at its closed end and having legs, said hood bridging said opposed walls and having its inner surface substantially co-extensive with said seats and said legs having their ends engaging the near surface of the ball to hold it substantially clear of said flow passage when the valve is in full open position, a holding member to engage said ball and hold it in line with said seats when the valve is in closable position, said actuating member having side stirrups extending from said hood outside the flow passage to said holding member.

HERMAN L. PAUL, Jr.

REFERENCES CITED

The following references are of record in the file of this patent:

UNITED STATES PATENTS

| Number | Name | Date |
|---|---|---|
| 440,025 | Fisher | Nov. 4, 1890 |
| 971,295 | Menear | Sept. 27, 1910 |
| 1,097,416 | Fraser | May 19, 1914 |
| 1,786,848 | Johnson | Dec. 30, 1930 |
| 1,855,106 | Gonyk | Apr. 19, 1932 |
| 2,395,212 | Blanchard | Feb. 19, 1946 |

FOREIGN PATENTS

| Number | Country | Date |
|---|---|---|
| 1,624 | Great Britain | Jan. 21, 1911 |
| 527,345 | Great Britain | Oct. 7, 1940 |
| 788,425 | France | July 29, 1935 |